United States Patent
Linkohr et al.

(10) Patent No.: US 6,844,828 B2
(45) Date of Patent: Jan. 18, 2005

(54) METHOD FOR PROVIDING ROAD USERS WITH INFORMATION AND DEVICE FOR CARRYING OUT SAME

(75) Inventors: Jochen Linkohr, Korb (DE); Klaus Mezger, Stuttgart (DE); Thomas Passegger, Metzingen (DE)

(73) Assignee: DaimlerChrysler AG, Stuttgart (DE)

( * ) Notice: Subject to any disclaimer, the term of this patent is extended or adjusted under 35 U.S.C. 154(b) by 60 days.

(21) Appl. No.: 10/456,958

(22) Filed: Jun. 9, 2003

(65) Prior Publication Data

US 2004/0008128 A1 Jan. 15, 2004

(30) Foreign Application Priority Data

Jun. 10, 2002 (DE) ......................................... 102 25 782

(51) Int. Cl.$^7$ .............................................. G08G 1/123
(52) U.S. Cl. ....................... 340/990; 340/905; 340/988; 340/995.17; 340/995.28; 701/201; 701/213; 342/357.07
(58) Field of Search ................................. 340/990, 988, 340/903, 904, 905, 435, 436, 425.5, 995.12, 995.17, 995.18, 995.25, 995.28; 701/25, 29, 201, 206, 213; 342/357.01, 357.06, 357.07, 357.13

(56) References Cited

U.S. PATENT DOCUMENTS

| | | | |
|---|---|---|---|
| 5,874,905 A | * | 2/1999 | Nanba et al. ............. 340/995.2 |
| 6,333,703 B1 | * | 12/2001 | Alewine et al. ........ 340/995.13 |
| 6,360,162 B1 | | 3/2002 | Meis et al. .................. 701/117 |
| 6,397,141 B1 | * | 5/2002 | Binnig ........................ 701/117 |
| 6,683,538 B1 | * | 1/2004 | Wilkes, Jr. ................... 340/903 |
| 6,765,495 B1 | * | 7/2004 | Dunning et al. ............. 340/903 |

FOREIGN PATENT DOCUMENTS

DE   197 49 978   6/1998

* cited by examiner

*Primary Examiner*—Davetta W. Goins
(74) *Attorney, Agent, or Firm*—Crowell & Moring LLP

(57) ABSTRACT

In a method for providing road users with information about a route section which is traveled along by a motor vehicle before a dangerous situation, the position and the duration of travel of the motor vehicle are repeatedly sensed along the route section using a sensor system in the motor vehicle. The measured values of the sensor system are stored as route points if the angular difference, weighted with the distance traveled along since the route point last stored, between the current direction of travel and the direction of travel at the route point last stored exceeds a predefined threshold value. A route point is stored when a warning function in the motor vehicle is activated in the dangerous situation, and the position of at least one route point and the current position of the motor vehicle are passed on in a warning message to the road users in a limited surrounding area. These measures inform the road users quickly and comprehensively about dangerous situations in the road traffic.

15 Claims, 2 Drawing Sheets

METHOD FOR PROVIDING ROAD USERS WITH INFORMATION AND DEVICE FOR CARRYING OUT SAME

This application claims the priority of German Application No. 102 25 782.5, filed Jun. 10, 2002, the disclosure of which is expressly incorporated by reference herein.

BACKGROUND AND SUMMARY OF THE INVENTION

The present invention relates to a method for providing road users with information and to a device for carrying out the method.

One of the main objects of current resource work has been to provide road users, in particular motor vehicles, with up to date information on traffic problems and dangerous situations in road traffic which are also caused by motor vehicles.

German publication DE 197 49 978 A1 discloses a method for informing a traffic control center about the distance traveled by a vehicle with a terminal in a road network, local data representing the respective location of the terminal being sensed repeatedly by a location determining device. Reference points are defined at a plurality of locations on the route traveled on the basis of criteria present in the terminal, the reference information which relates to these reference points being transmitted from the terminal to the traffic control center.

The sensing of the route of a vehicle is suitable for detecting vehicles traveling in the wrong direction and for acquiring geographical traffic information. The latter information can be used by a control center to assign traffic data, for example vehicle speed and travel time, to locations on the vehicle's route, that is to say to locations in a digital map of the road network, traffic state messages, traffic messages and navigation aids being generated in the control center on the basis of traffic data of a plurality of vehicles.

One object of the invention is the object of specifying a method for providing road users with information on a dangerous situation, which method makes it possible for road users to have a rapid, direct and detailed overview of the location or the region of the dangerous situation. Another object of the invention is to provide a device for carrying out the method.

In one method for providing road users with information about a route section traveled along by a motor vehicle before a dangerous situation, the position and the direction of travel of the motor vehicle are sensed repeatedly as measured values along the route section in a suitable sensor system in the motor vehicle. The measured values of the sensor system are stored as route points if the angular difference, weighted with the distance traveled along since the route point last stored, between the current direction of travel and the direction of travel at the route point last stored exceeds a predefined threshold value. In addition, a route point is stored when a warning function in the motor vehicle is activated in the dangerous situation. The position of at least one stored route point and the current position of the motor vehicle are passed on in a warning message to the road users in a limited surrounding area.

As a result of the transmission of positions which have just been traveled through during or before a dangerous situation, linked to a warning, other motor vehicles which are located in the surroundings are made aware of a source of danger, for example of a motor vehicle which is stationary on the road way or of a vehicle which is approaching a traffic jam. The weighting of the angular difference with the distance traveled, that is to say linking of a length measurement to an angular value, ensures that reference points are generated even in bends with very tight radii of curvature. For example, it is thus possible even to sense a motor vehicle which turns around on a road and travels in the opposite direction on the same carriageway, either intentionally or as a result of compulsion. The information content and thus the local resolution of the warning message is increased or improved significantly with respect to the methods known from the prior art. The road users receive their information on dangerous situations and their origins directly from the motor vehicle which is causing the danger or from the motor vehicle which is threatened by the danger. The fastest possible communication is provided. The method is particularly suitable for application on high speed roads and/or freeways.

Preferably the following is true $|\Delta\phi\Delta s|>1.0*10^{-1} \ deg^2$, $\Delta s$ being the distance traveled since the route point last stored, $\Delta\phi$ being the angular difference between the current direction of travel and the direction of travel at the route point last stored and $1.0*10^{-1} \ deg^2$ being the threshold value. The order of magnitude of the threshold value has proven particularly favorable in practice. As a result, a route point is generally set even in tight bends. Optimum resolution of the route section profile is ensured.

In particular, two successive route points can be a predefined minimum distance apart. This criterion avoids an excessively large number of route points which are not required to determine and reproduce the route section which is actually being traveled along.

In a further refinement of the invention, the distance between two successive route points lies below an upper threshold value in the respective longitude and latitude. All the distance information is given in geographic units, which avoids additional conversion steps in the algorithm of the execution of the program.

The driver preferably activates the warning function. As a result of automatic activation, the user of the motor vehicle can freely decide whether he sees his vehicle as a risk for other road users in the given situation. However, activation can also take place automatically as a function of a vehicle parameter. For example a hazard warning light may be provided as the warning function.

In particular, the road user can decide on the relevance of the dangerous situation for his own further course of travel by means of the received positions over the route section traveled along by the motor vehicle. The road user checks the route section of the vehicle outputting the warning message for correspondence with at least part of his route section last traveled along. The road user does not require a digital road map for this relevance check. He can use simple, known arithmetic methods to decide whether he is located on the road or lane with the expected obstacle.

In a further refinement of the invention, the road user also checks the route section of the motor vehicle for correspondence with at least part of his course of travel which is still to be traveled along. This requires the road user to be capable of using his own navigation system and digital road map to acquire data on at least part of his future course of travel and check this data for correspondence with the route section of the vehicle.

One way of achieving the second object mentioned is by way of a device for carrying out the method mentioned in which a navigation system is provided as sensor system for repeatedly sensing the position and the direction of travel of the motor vehicle.

The navigation system may be a GPS receiver.

Further advantageous refinements of the invention are apparent from the dependent claims.

The invention will be explained in more detail by means of a plurality of exemplary embodiments in the figures. Other objects, advantages and novel features of the present invention will also become apparent from the following detailed description of the invention when considered in conjunction with the accompanying drawings.

DETAILED DESCRIPTION OF THE INVENTION

Figure 1:
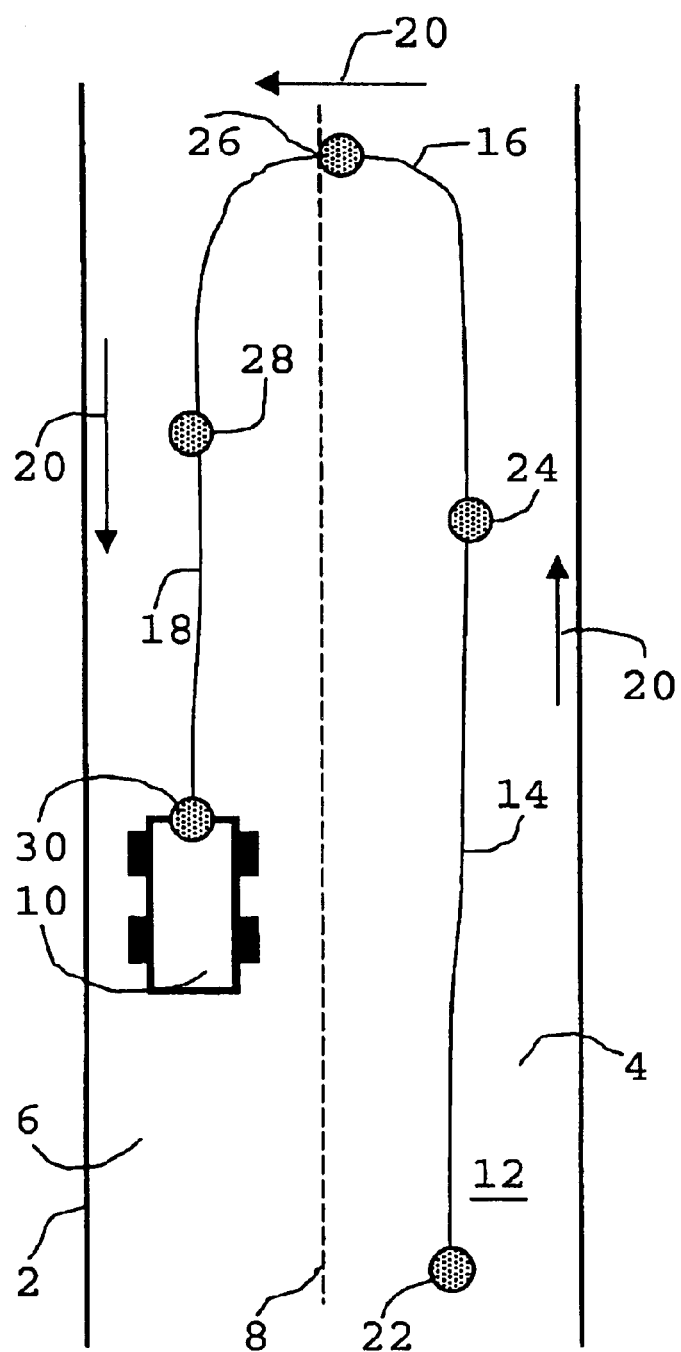
FIG. 1 shows a schematic view of a route section which a motor vehicle has traveled along on a road.

The road 2 which is illustrated in FIG. 1 comprises a lane 4 and a lane 6 in the opposite direction, said lanes being separated from one another by means of a dashed line 8. A motor vehicle 10 which is located on the lane 6 in the opposite direction has engine damage in this exemplary embodiment and has reached his final position at the position represented. On the way to the final position, the motor vehicle 10 finally traveled through the route section 12 which is composed of a lane region 14, a bend region 16 and a region 18 of the lane in the opposite direction. The direction of travel is described by means of the arrows 20.

In a method for providing road users with information about the route section 12 which has been traveled along by the motor vehicle 10 before and during a dangerous situation, the position and the direction of travel of the motor vehicle 10 are sensed repeatedly, for example, once per second, with a GPS receiver as navigation system. The dangerous situation is illustrated here by means of the stationary motor vehicle 10. However, the dangerous situation can also be formed by slowly traveling motor vehicles which are located, for example, in a traffic jam.

On the route section 12, the measured values, in other words the position and the direction of travel, are stored as route points 22, 24, 26, 28, if the angular difference $\Delta\phi$ which is weighted with the distance $\Delta s$ traveled along since the route point 22 to 28 last stored, between the current direction of travel and the direction of travel at the route point 22 to 28 last stored exceeds a predefined threshold value of $1.0*10^{-1}$ deg$^2$, i.e. if $|\Delta\phi\Delta s|>1.0*10^{-1}$ $deg^2$ is true. This threshold value has proven particularly useful in practice. However, it is also possible to use other values for the threshold value. In exemplary embodiments which are not illustrated in more detail it is also possible to use other suitable sensor systems instead of the GPS receiver. It is appropriate to start the method whenever a new set of positions is received by means of the GPS.

When a warning function is activated by the driver in the stationary motor vehicle 10, which function can also optionally be automatically activated in accordance with a motor vehicle parameter, a further route point 30 is stored. The positions of the route points 22 to 30 and the current position of the motor vehicle are passed on in a warning message to the road users, i.e. in other words to further motor vehicles, in a limited surrounding area. The warning function may be implemented, for example, by means of the light signal of a hazard warning light. Audible signals are also conceivable.

In this exemplary embodiment, the positions of the last four route points 22 to 28 before the route point 30 which is stored when the warning function is activated, the position of the route point 30 and the current position, if the latter deviates from the position of the route point 30, are passed on to the road users. In this exemplary embodiment, the two latter positions correspond. The number of route points may vary and is dependent on the configuration of the program structure of the method and on the transmission capacity of the wire-free vehicle-to-vehicle communication.

Two successive route points 22 to 28 are at a minimum distance apart, for example a minimum distance of $9.0*10^{-4}$ deg. The distance between two successive route points 22 to 28 also lies below an upper threshold value in the respective longitude and latitude. The upper threshold value is $2^{-4}$ deg for the longitude and $2^{-5}$ deg for the latitude in this exemplary embodiment. This ensures that the route section 12 is sensed neither with too few nor with too many route points. The minimum distance also ensures that there is a sufficient length of the route section between 1500 and 2500 m. If no minimum distance were predefined, too many route points would be stored at low speeds and when there are large angular changes, and said route points would be subject, as a matter of principle, to a large degree of measuring error in the data for the direction of travel, as a result of which the length of the route section would be significantly shortened for a predefined number of route points, and would therefore no longer be of benefit as useable information.

The distance between two route points 22 to 30 is calculated from the difference between the respective positions or from the distance actually traveled between two route points with the vehicle. The distance actually traveled is determined using an odometer, which is not considered in the first alternative. The method ensures good results with both alternatives.

When the system is started in order to represent a new route section, all five route points 22 to 30 are set to the current position. If the route is interrupted, for example by a passage through a tunnel, no position data is received by the GPS receiver and a new system start must take place.

The route points 22, 24 are arranged in the lane region 14 of the route region 12, the route point 22 marking the start of the route region 12. The route point 26 is arranged in the bend region 16 of the route region 12 and describes the turning maneuver of the motor vehicle 30. The distance between the route points 26 and 24 is smaller here than the distance between the route points 24 and 22. On the route in the curve region 16, the product $\Delta\phi\Delta s$, the decisive criterion for the storage of a new route point, owing to the large angular changes rapidly exceeds the predefined threshold value, and the route point 26 is stored. The distance between the route point 28, which is positioned on the region 18 of the lane in the opposite direction, and the route point 24 is smaller than the distance between the route points 24 and 22. The large angular change in the bend region 16 still affects the definition of the route point 28. The distance between the route point 30, which is defined when the warning function is activated, and the route point 28 is independent of the criterion $|\Delta\phi\Delta s|>1.0*10^{-1}$ deg$^2$, as a route point is set as a matter of principle when the warning function is activated.

Figure 2:
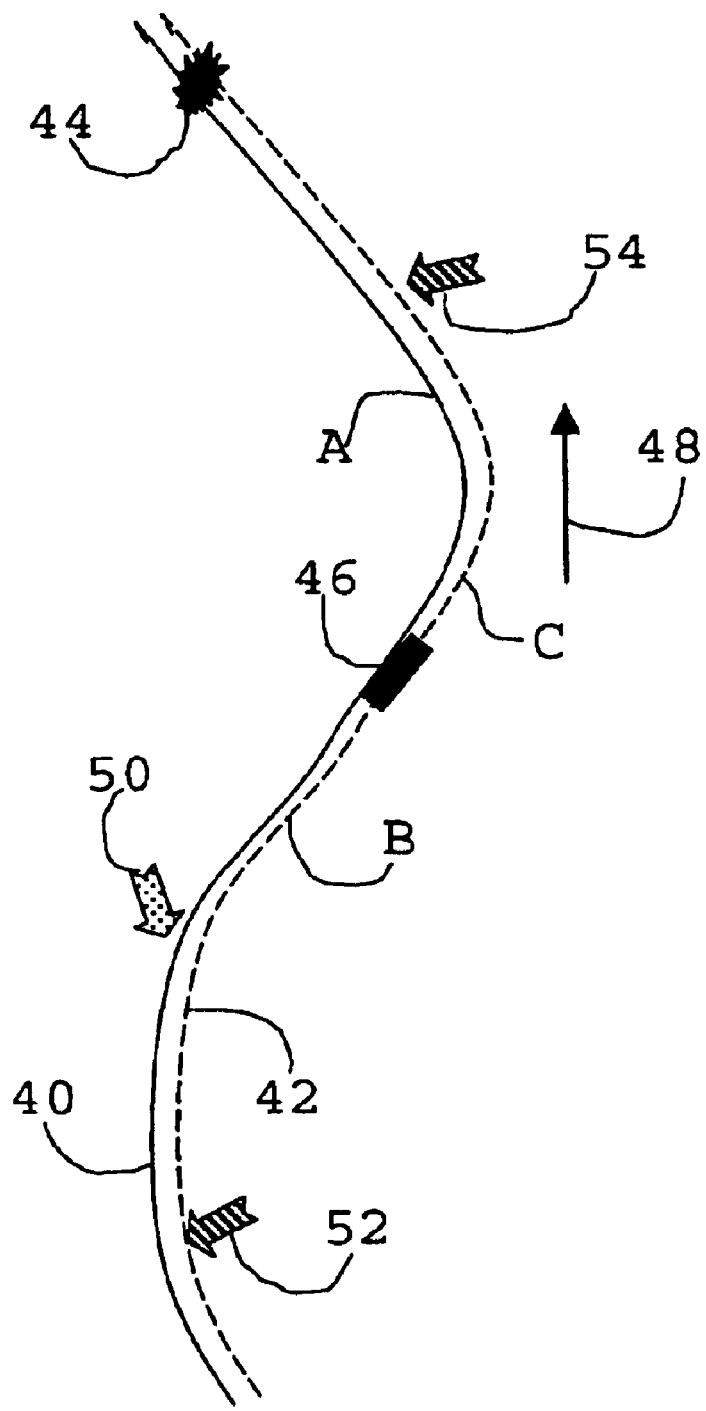
FIG. 2 shows a schematic view of two motor vehicles on a road with overlapping route sections.

FIG. 2 shows the routes 40, 42 of two motor vehicles 44, 46 in a schematic view. Both motor vehicles 44, 46 are on the same road (not illustrated in more detail) in this exemplary embodiment. The motor vehicle 44 is in a stationary state on the road, for example caused by engine damage, its route 40 being described by means of a continuous line. The motor vehicle 46 is moving toward the stationary vehicle 44 on the road, the corresponding route 42 being represented by dashed lines. The direction of travel is indicated by the arrow 48.

According to one method, the motor vehicle 44 has sensed the route section A between the arrow 50 and its current position. The motor vehicle 46, which is approaching the motor vehicle 44 without visual contact, has, according to the method, sensed the route section B between the arrow 52 and its current position. In addition, the motor vehicle 46 has means which also inform it about a limited section of its further path. The motor vehicle 46 thus also senses the route section C between the arrow 54 and its current position.

According to one method, the motor vehicle 44 uses a radio device to transmit the position of the route point stored when the warning function was activated, the positions of the route points last stored and the current position of the motor vehicle 44 in a warning message to further road users in a limited area surrounding its location. The motor vehicle 46, which is located in this area, receives the warning message.

The motor vehicle 46 uses the received positions over the route section A traveled along by the motor vehicle 44 to decide on the relevance of the dangerous situation for its own further course of travel.

The motor vehicle 46 checks the route section A already traveled along by the motor vehicle 44 for correspondence with at least part of its route section B last traveled along. If it finds sufficient correspondence in the profile of the route sections A and B, the procedure running without the use of a digital route map, it is possible conclude from this that the motor vehicles 44, 46 are on a road. The warning message of the motor vehicle 44 is thus relevant to the motor vehicle 46.

As an alternative, or in addition, the motor vehicle 46 compares the route section A of the motor vehicle 44 with at least part of the route section C for correspondence.

The relatively large overlap between the route section A and the route sections B and/or C leads to more precise identification results. If the motor vehicle 46 which is approaching the motor vehicle 44 can predict its further course of travel for an appropriately large distance, the data on the relevance of the event is issued with a relatively large degree of precision.

The quality or precision of the data on the correspondence between two lanes depends on various parameters. The lanes which are to be compared must have a sufficient overlap over their length. In addition, the respective lanes, i.e. the associated route sections must be sufficiently well reproduced by the route points representing them. The local resolution, the quantity and positioning of the route points used, the precision of the navigation systems used as well as deviations owing to the width of the road and driving maneuvers are factors which considerably influence the result. The mathematical algorithms to be applied for comparing the lanes for correspondence are known from various applications.

With the method specified, the route points are stored in such a way that only the characteristic route elements of a route section, that is to say locations where marked geometric changes take place, are particularly taken into account.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing road users with information about a route section traveled along by a motor vehicle before a dangerous situation, comprising:

repeatedly sensing a position and a direction of travel of the motor vehicle along the route section using a sensor system in the motor vehicle, storing measured values of the sensor system as route points if an angular difference, weighted with a distance traveled along since the route point last stored, between a current direction of travel and the direction of travel at the route point last stored exceeds a predefined threshold value, storing a route point when a warning function in the motor vehicle is activated in the dangerous situation, and passing on a position of at least one route point and a current position of the motor vehicle in a warning message to the road users in a limited surrounding area.

2. The method as claimed in claim 1, wherein $$|\Delta\phi\Delta s|>1.0*10^{-1} \, deg^2$$

when $\Delta s$ is said distance traveled along since the route point last stored, $\Delta\phi$ is said angular difference between the current direction of travel and the direction of travel at the route point last stored, and $1.0*10^{-1} \, deg^2$ is said threshold value.

3. The method as claimed in claim 1, wherein two successive route points are a predefined minimum distance apart.

4. The method as claimed in claim 1, wherein a distance between two successive route points lies below an upper threshold value in respective longitude and latitude.

5. The method as claimed in claim 1, wherein a distance between two route points is formed from a difference between geographical positions.

6. The method as claimed in claim 1, wherein a distance between two route points corresponds to a distance traveled with the vehicle.

7. The method as claimed in claim 1, wherein a driver activates the warning function.

8. The method as claimed in claim 1, wherein the warning function is activated automatically.

9. The method as claimed in claim 1, wherein a road user decides on relevance of the dangerous situation for the road user's own further course of travel by received geographical positions over the route section traveled along by the motor vehicle.

10. The method as claimed in claim 9, wherein the road user checks the route section (A) of the vehicle for correspondence with at least part of the route section (B) last traveled along by the road user.

11. The method as claimed in claim 9, wherein the road user checks the route section (A) of the vehicle for correspondence with at least part of the course of travel which is still to be traveled along by the road user.

12. A device for carrying out the method as claimed in one of claims 1 to 11, wherein a navigation system is provided as sensor system for repeatedly sensing the position and the direction of travel of the motor vehicle.

13. The device as claimed in claim 12, wherein a GPS receiver is provided as said navigation system.

14. The device as claimed in claim 12, wherein a hazard warning light performs the warning function.

15. The device as claimed in claim 12, wherein a radio device is provided for communicating the warning message.

* * * * *